United States Patent [19]

Ho et al.

[11] Patent Number: 5,424,756
[45] Date of Patent: Jun. 13, 1995

[54] TRACK PAD CURSOR POSITIONING DEVICE AND METHOD

[76] Inventors: Yung-Lung Ho, 8929 Lombard Pl., #118, San Diego, Calif. 92122; Kwok-Leung Li, 56 Woodhaven Wood Dr., The Woodlands, Tex. 77380

[21] Appl. No.: 60,839

[22] Filed: May 14, 1993

[51] Int. Cl.⁶ .............................................. G09G 3/02
[52] U.S. Cl. .................................. 345/158; 345/175
[58] Field of Search ............... 345/156, 158, 166, 163, 345/157, 165, 158, 175, 173; 178/18, 19; 382/59, 65; 341/22

[56] References Cited

U.S. PATENT DOCUMENTS

| | | | |
|---|---|---|---|
| 4,409,479 | 10/1983 | Sprague et al. | 345/166 |
| 4,550,221 | 10/1985 | Mabusth | 345/173 |
| 4,578,674 | 3/1986 | Baker et al. | 345/159 |
| 4,734,685 | 3/1988 | Watanabe | 345/166 |
| 4,880,967 | 11/1989 | Kwang-Chien | 345/166 |
| 4,899,138 | 2/1990 | Araki et al. | 345/175 |
| 4,905,174 | 2/1990 | Ouchi | 345/175 |
| 4,916,308 | 4/1990 | Meadows | 345/175 |
| 4,988,982 | 1/1991 | Raymer | 345/173 |
| 5,105,186 | 4/1992 | May | 345/84 |
| 5,164,714 | 11/1992 | Wehrer | 345/175 |
| 5,195,179 | 3/1993 | Tokwaga | 345/163 |
| 5,231,380 | 7/1993 | Logan | 341/22 |
| 5,274,361 | 12/1993 | Snow | 345/166 |

FOREIGN PATENT DOCUMENTS

| | | |
|---|---|---|
| 0419145 | 3/1991 | European Pat. Off. |
| 5110330 | 8/1980 | Japan ............ 345/175 |
| 60-178526 | 9/1985 | Japan ............ 345/175 |
| 2152250 | 7/1985 | United Kingdom ..... 345/175 |

OTHER PUBLICATIONS

The Unmouse Microtouch Systems Inc. by MicroTouch.
The Unmouse PC User's Guide, 1992, Microtouch Systems, Inc., pp. 1-63.
"IBM Technical Disclosure Bulletin" vol. 28, No. 5 Oct. 1985 pp. 1840-1842.

*Primary Examiner*—Richard Hjerpe
*Assistant Examiner*—Lun-Yi Lao
*Attorney, Agent, or Firm*—Sixbey, Friedman, Leedom & Ferguson

[57] ABSTRACT

The track pad cursor positioning device and method simulate the movement of a track-ball cursor controller by generating directional light curtains which facilitate optical sensing of the velocity and direction of movement of a pointer across a tracking area to generate a cursor control signal as a function thereof to control cursor movement. If a pointer is sensed but there is no pointer movement relative to the tracking surface, no control signal to move a cursor is generated, but if the presence of a pointer is not sensed after a cursor control signal has been generated, then a cursor control signal is provided which results in continued movement but deceleration of the cursor. The track pad cursor positioning device provides a miniature package which may be incorporated as part of a personal computer keyboard.

25 Claims, 5 Drawing Sheets

FIG_7

TRACK PAD CURSOR POSITIONING DEVICE AND METHOD

TECHNICAL FIELD

The present invention relates generally to cursor positioning devices for computers and video display units and more particularly to a pad-shaped cursor positioning device and method which involves sensing the velocity of a digit or a pointer moving across a pad.

BACKGROUND OF THE INVENTION

Computers normally use a cursor which appears on the video screen and moves under the control of a cursor control device. Some cursor control devices are merely keys on the computer keyboard to move the cursor in a horizontal or vertical direction. Key control requires the use of a plurality of keys and is a time consuming method for achieving a desired cursor position.

Cursor positioning has been accomplished with a mechanical joy stick of the type commonly used for video games, and although more rapid control may be achieved in this manner than with key control, joysticks are subject to wear which ultimately results in cursor positioning inaccuracies.

A very popular form of cursor control is the small, hand held "mouse" which is moved by hand over a working surface to provide cursor control signals which cause a controlled movement of a cursor on a display screen. A mouse may be mechanical or optical, but both require a considerable extent of working surface for operation. The mechanical mouse counts the revolutions of a ball or orthogonal wheels which turn as the mouse moves over a surface, while the optical mouse senses a grid to produce cursor command signals.

Alternatively, a number of touch pad control units have been developed in the past. These are generally pressure sensitive or capacitive sensitive touch pads where either the pressure of an operator's finger on a membrane switch array or a change in capacitance resulting from contact by an operator's finger with an array or a single conductive plate provides output control signals for a cursor. These are primarily position sensing units which sense the actual position of a finger or pointer on a touch pad using some type of electronic array which provides a coordinate type of response indicative of position. The output signals from such an array, as illustrated by U.S. Pat. No. 4,550,221 to Mabusth, represent the x and y coordinates of a desired cursor position. A device which provides a velocity control signal by calculating the differences in sensed finger position versus time is disclosed in U.S. Pat. No. 4,988,982 to Rayner.

Pressure sensitive and capacitive or resistive touch pads are subject to wear, friction and the effects of stray electrostatic and electromagnetic fields, and are additionally subject to damage from moisture or liquid spilled on the pad and electronic array. Moreover, the manufacturer may be restricted in choosing a suitable material for the pad surface. In an attempt to circumvent these problems, optical touch entry systems have been developed using opto-matrix light arrays to create a switch matrix and to detect the presence and location of an element in an irradiated field. These systems, as illustrated by U.S. Pat. No. 5,164,714 to Wehner are not subject to wear in high use environments, but they generally require the use of a large surface area, such as a computer screen, bordered by an extensive array of light emitting and detecting elements. The number of light emitting and detecting elements corresponds directly to the number of positions at which the cursor can be positioned in each direction. As such, accurate positioning will not occur without the use of an unacceptably large number of detectors. These systems require large amounts of energy to drive the light emitters and detectors and are often subject to inaccuracy due to ambient light and glare unless complex light modulation systems or ambient light compensation systems are provided.

Of the known, small mechanical cursor positioning devices, the track-ball controller has proven superior as a cursor position controller for portable personal computers and video games. Like other mechanical controllers, however, the track-ball controller has several drawbacks. It can be uncomfortable on the hand, and difficult to use if the ball is small, while a large track-ball controller is difficult to implement on notebook sized personal computers. Finally, being mechanical, it requires maintenance, is subject to wear, and is less reliable than solid state devices.

DISCLOSURE OF THE INVENTION

It is a primary object of the present invention to provide a novel and improved track pad cursor positioning device and method wherein the velocity of movement of a pointer in an x and y direction is optically sensed and a velocity control signal is generated to cause cursor movement in a two dimensional vector. Movement of the pointer relative to a miniature track pad is facilitated so that the track pad may be part of a laptop computer, may be hidden within a laptop computer or positioned on pivot arms attached to a personal computer.

Another object of the present invention is to provide a novel and improved track pad cursor positioning device and method wherein the velocity of movement of a pointer in an x and y direction is optically sensed and a velocity control signal is generated, the velocity control signal is compared to a predetermined threshold value and when the velocity control signal exceeds the threshold value, the signal is used to cause cursor movement in a two dimensional vector at a speed which is a function of the magnitude of the sensed velocity of movement. When the velocity control signal is less than the threshold value in a sensed direction, only limited movement of the cursor in that direction is permitted.

A further object of the present invention is to provide a novel and improved track pad cursor positioning device and method which simulates the operation of a track-ball cursor controller. The velocity of a pointer across a track pad is sensed by an optical system which employs a pair of orthogonal, directionally oriented light curtains to generate a velocity control signal to control cursor movement, and the velocity control signal is terminated to halt cursor movement when the sensed pointer is present but pointer movement stops.

Yet another object of the present invention is to provide a novel and improved track pad cursor positioning device and method which simulates the movement of a track-ball cursor controller by causing cursor movement to continue but to decelerate after a sensed pointer is removed from a track pad sensing area.

A still further object of the present invention is to provide a novel and improved track pad cursor positioning device which employs directional light curtains to create a sharply defined shadow created by the leading and/or trailing edge of a pointer in two orthogonal directions of movement which is optically sensed to determine pointer velocity. Sensing is accomplished using the light curtain with densely packed light sensors. Alternatively, pointer velocity can be determined by sensing the infrared emission from a human finger. No contact between the pointer and an underlying track is necessary, thus facilitating the incorporation of the track pad as a personal computer while permitting flexibility in choosing the shape and texture of the surface material for the track pad.

Yet a further object of the present invention is to provide a novel and improved track pad cursor positioning device of small size which can be mounted directly on a laptop computer or a personal computer keyboard.

PREFERRED EMBODIMENT OF THE INVENTION

The track pad cursor positioning device and method of the present invention electronically models the action of a track-ball by optically sensing the motion of a finger, thumb, or other pointer across a sensing area having a surface that can be shaped and textured for comfort and tactile feedback. In fact, there is actually no need for the pointer or finger to actually contact the surface of the sensing area if such should be desirable. In addition, only the velocity of the moving digit, instead of its absolute position, will be sensed. Given the velocity input in two orthogonal directions, e.g., Vx in the horizontal x, Vy in the vertical, y direction, simplified the expressions for the spin rates of the model track-ball can be written as $$S_x = V_x/r - Hf \int S_x dt \quad (1)$$

and $$S_y = V_y/r - Hf \int S_y dt \quad (2)$$

Here, Sx and Sy are the spin rates of the ball in the x and y directions, r is the modeled ball radius, and f is the friction coefficient that will model the slow down rate of the ball when it is not being spun manually. The coefficient H is set to 0 when physical contact between the manipulating digit and the pad is present and is set to 1 otherwise. Note that being a virtual ball, the ball radius r can be a function of velocity, i.e., as Vx and Vy increases, r may decrease. This allows for rapid, albeit less accurate positioning of the cursor. The values of r and f are software parameters that can be selected by the user.

Figure 1:
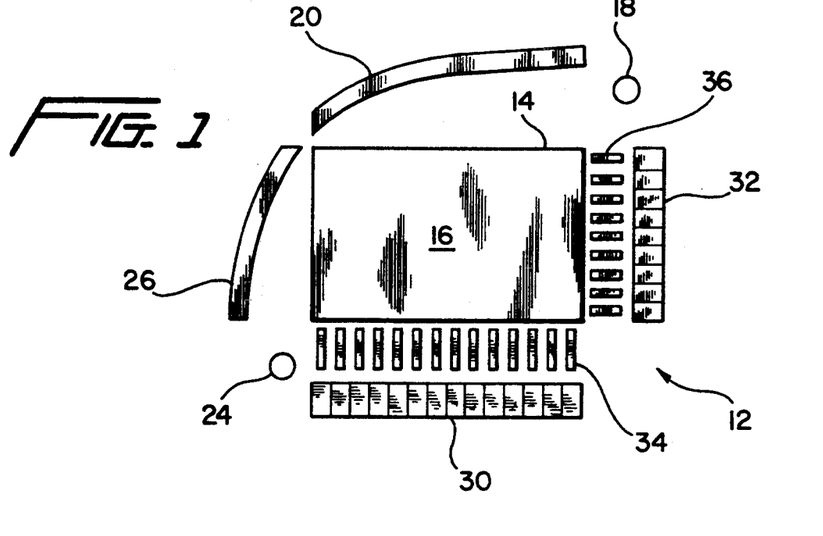
FIG. 1 is a diagram of the track pad structure for the track pad cursor positioning device of the present invention.
Figure 2:
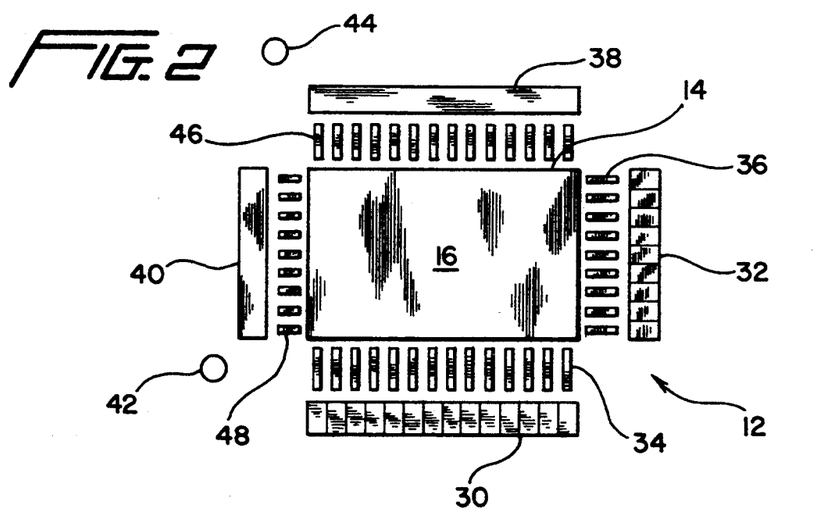
FIG. 2 is a diagram of a second embodiment of the track pad structure for the track pad cursor positioning device of the present invention.
Figure 3:
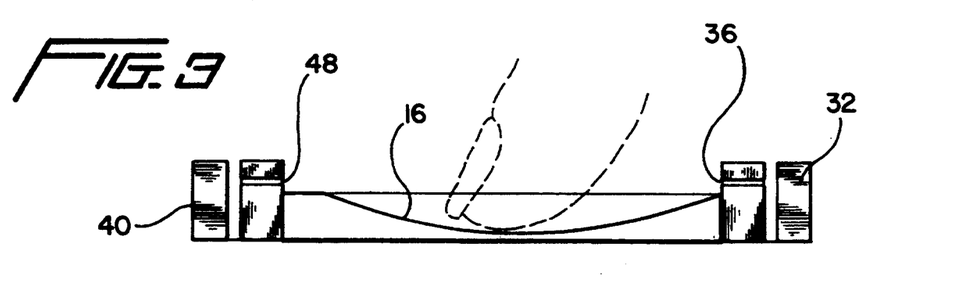
FIG. 3 is a sectional view of the track pad of FIG. 2.

Referring now to FIGS. 1-3, the track pad cursor positioning device of the present invention indicated generally at 10 employs a detection system 12 which is adapted to directly measure the motion of any optically opaque object. This detection system involves the use of a track pad 14 provided with a sensing area 16 which may be a curved or flat surface as desired. In FIG. 1, the detection system 12 is an optical system, so that highly directional light (preferably infrared) is sent across the sensing area in orthogonal x and y directions. Thus, a light source 18 is provided at the focal point of a two dimensional parabolic mirror 20 to operate through the parabolic mirror to send a highly directional curtain of light across the sensing area 16 in the x direction. Similarly, a second light source 24 combined with a two dimensional parabolic mirror 26 creates a curtain of highly directional light in the y direction across the sensing area 16. The light sources 18 and 24 may be single light emitting diodes (LEDs) while the light detectors are small semiconductor detection devices such as light detecting diodes.

Positioned opposite to the light sources 18-20 and 24-26 are densely packed light detector arrays 30 and 32 responsive to light in a limited frequency range (such as infrared) which, in combination with the highly directional light curtains, reduce or substantially eliminate the effects of ambient light and glare created thereby on the sensing area 16 of track pad cursor positioning device. The individual detectors within each array are spaced 0.05 inches or less apart. If the incoming light to the detector arrays 30 and 32 is not sufficiently directional to facilitate a sharp definition of the edges of a pointer, light conduits 34 and 36 may be placed in front of each detector of the arrays to narrow the detector field of view. These conduits can be simple, narrow long holes or optical fibers.

By employing curtains of light across the sensing area 16 combined with closely packed individual light detectors, it is possible to cause a finger or pointer in the sensing area to cast a sharply defined shadow on the light detectors 30 and 32 which then identify both the leading and the trailing edge of the shadow. By repeatedly sensing at a known rate the leading and/or trailing edge locations of a finger or pointer, it is possible to determine the velocity at which the finger or pointer is moving in the x and y directions. This calculation can be easily made since the scan repeat time for each of the group of detectors 30 and 32 and the distance between detectors is known. Additional lenses or mirrors may be added in certain configurations to facilitate sensors which may be packed less than 0.05 inches apart.

As illustrated in FIG. 2, a collimated directional light curtain can be directed across the sensing area 16 by replacing the two dimensional parabolic mirrors of FIG. 1 with frosted glass light diffusers 38 and 40 that receive light from LED's 42 and 44. Collimation of the light from the light diffusers is provided by narrow light conduits or optical fibers 46 and 48 which are opposite to but correspond with the conduits or fibers 34 and 36.

Figure 4:
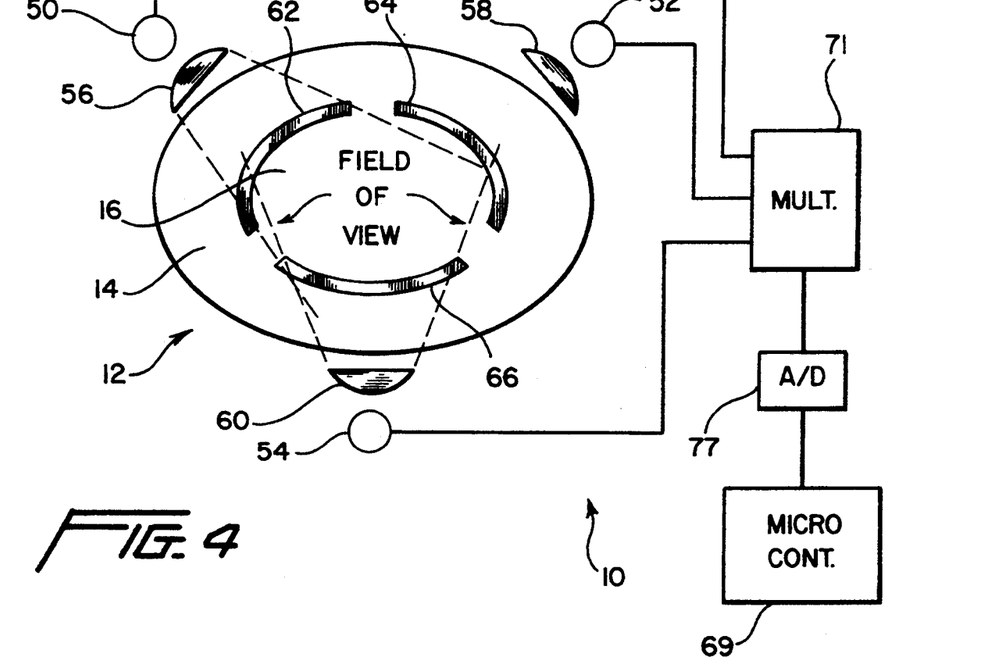
FIG. 4 is a diagram of a third embodiment of the track pad structure for the track pad cursor positioning device of the present invention.

If the detection system 12 uses infrared detectors tuned to detect the 98° F. black-body radiation emitted by the human body, then the light sources 18 and 24 of FIGS. 1 and 2 can be eliminated as shown in FIG. 4. Here the human finger is used as a pointer, and the black-body radiation emitted by the finger is sensed to define the distance to each of the detectors. As with all types of radiation, the intensity of black-body radiation emitted by the human body falls off with distance. Thus, by using three infrared detection diodes 50, 52 and 54 with suitable lenses 56, 58 and 60 to create a field of view encompassing the sensing area 16, it is possible to measure the motion of living tissues in the field of view for the detector diodes. To simplify the evaluation of distance from detected radiation, it may be necessary to limit the field of view of the diodes in the vertical direction to cause the system to reduce to two dimensions the infrared light level detected at each diode, and thus this light level should be directly proportional to the distance to the emitter or finger. To achieve this, the conduits 42, 44, 46 and 48 in the track pad 14 are replaced by three arcuate slits 62, 64 and 66 which open around the periphery of the sensing area 16 and extend horizontally outward to a second opening opposite the lenses 56, 58 and 60 to provide a vertically limited field of view for the diodes 50, 52 and 54. This field of view and the extent of the slits is illustrated by broken lines for two of the diodes in FIG. 2.

Each diode 50, 52 and 54 will have a different proportionality constant depending on the initial position of the black-body radiation emitter on the sensing area 16. These can be set for each diode to the light level at the time of physical contact with the sensing area, and a simple pressure transducer beneath the sensing area can be used to signal such a contact. In addition, the pressure transducer output can be used to set the coefficient H of equations 1 and 2 which is set in the optical system of FIGS. 1 and 2 by the detection of any obstructed light path. The diodes 50, 52 and 54 provide an analog output to the multiplexer and circuit of FIG. 6 to be described.

Figure 5:
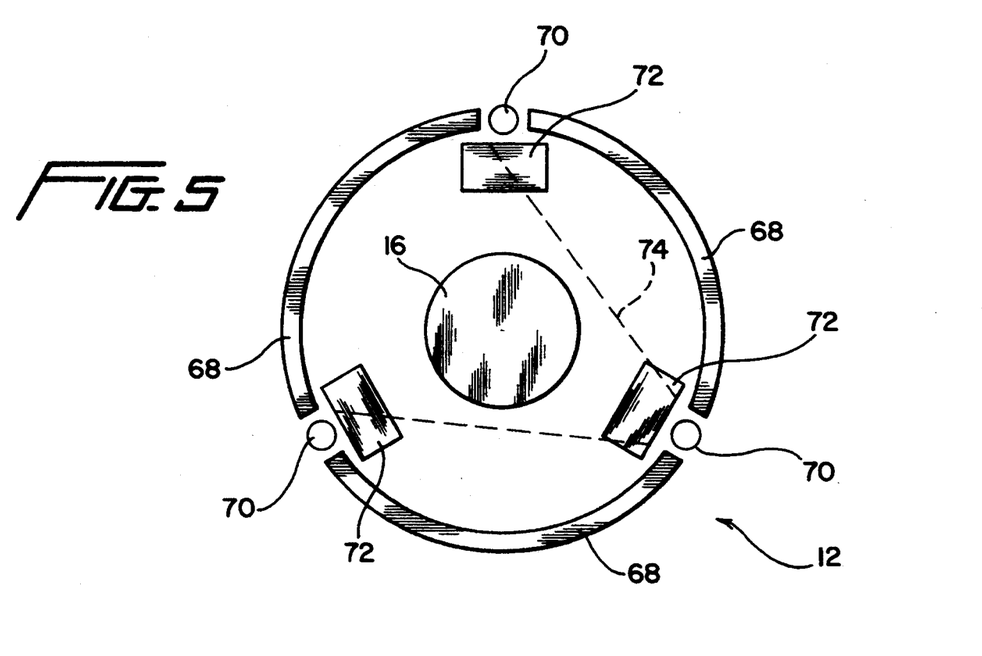
FIG. 5 is a diagram of a fourth embodiment of the track pad structure for the track pad cursor positioning device of the present invention.

FIG. 5 illustrates an embodiment of the track pad of FIGS. 1–4 where either a finger or a pointer may be used to move across the sensing area 16. The sensing area is circular in configuration and is substantially surrounded by arcuate shaped illumination strips 68 which are equally spaced from the perimeter of the sensing area. These illumination strips are substantially equal in length and between the ends thereof at approximately the 0, 120 and 240 degree positions on the circle formed by the illumination strips are light sensing detectors 70. In front of each detector are two superimposed vertically spaced flat plates, the top plate of which is shown at 72. These plates are opaque and limit the vertical angle of view for each detector, thereby providing a two dimensional viewing systems. Each detector has a viewing angle in a vertically limited plane such as the single detector viewing angle indicated at 74.

The illumination strips 68 may be back illuminated frosted glass, and the detectors 70 are tuned to the emitted light frequency of light emitted by the illumination strips. These detectors will detect the decrease in light intensity due to the presence of a pointer at various positions in the sensing area, and the light decrease sensed by any detector is a function of the distance of the pointer from the detector. Therefore, by using the three detectors to sense light intensity, the velocity of movement of the pointer in the x and y directions can be tracked.

Figure 6:
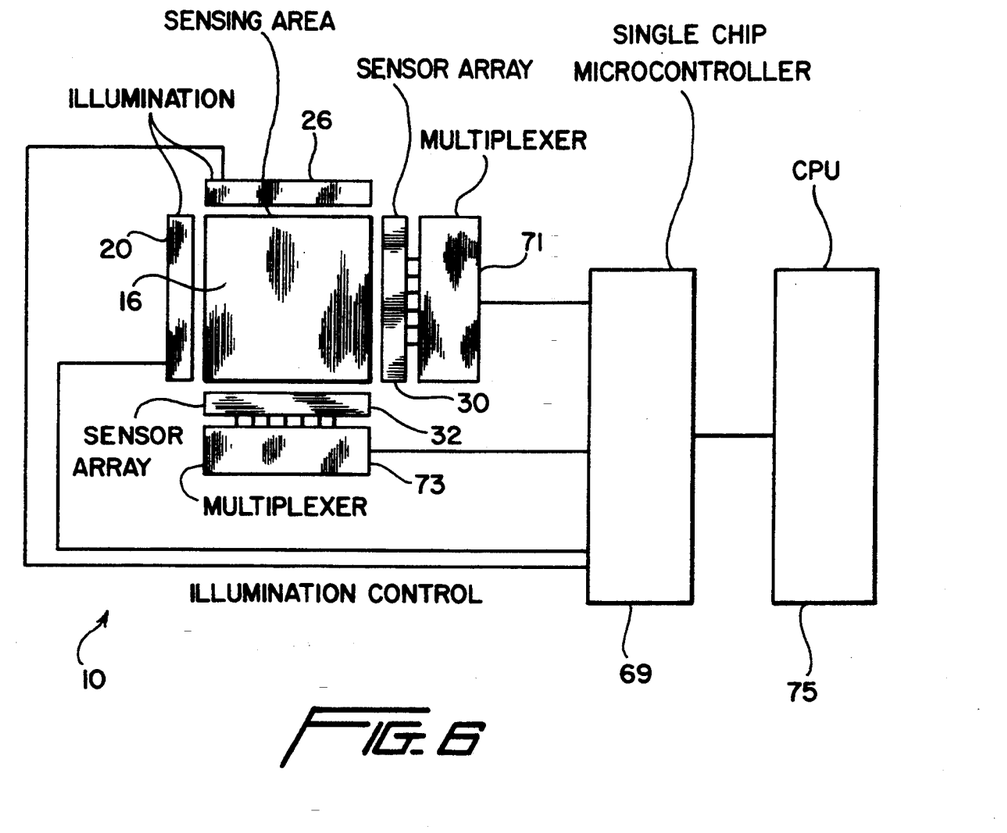
FIG. 6 is a block diagram of the track pad cursor positioning device of the present invention.

Turning now to FIG. 6, the track pad cursor positioning device is controlled by a single chip microcontroller 69 which scans the outputs provided by x and y multiplexers 71 and 73 respectively. Each of the closely packed detectors in the detector arrays 30 and 32 has an output terminal which is connected to the multiplexer 71 for the array 30 and to the multiplexer 73 for array 32. The single chip microcontroller causes the multiplexers 71 and 73 to scan the outputs of their associated detector arrays once during each scan period, and a plurality of scan periods per second are initiated by the single chip microcontroller. The outputs from the multiplexers are provided to the single chip microcontroller, and since the period between scans is known, the microcontroller is enabled to compute the velocity of movement of a finger or pointer in the sensing area 16 in both the x and y directions. This computed velocity is then output as a cursor control signal to the cursor control section of a computer 75.

In FIG. 6, the multiplexers 71 and 73 are shown connected to the sensor arrays of FIGS. 1 or 2. In the systems of FIGS. 4 and 5, each of the light detectors 50, 52 and 54 or 70 are connected to a single multiplexer 71 and then through an analog to digital converter 77 to the single chip microcontroller 69 as shown in FIG. 4.

Figure 7:
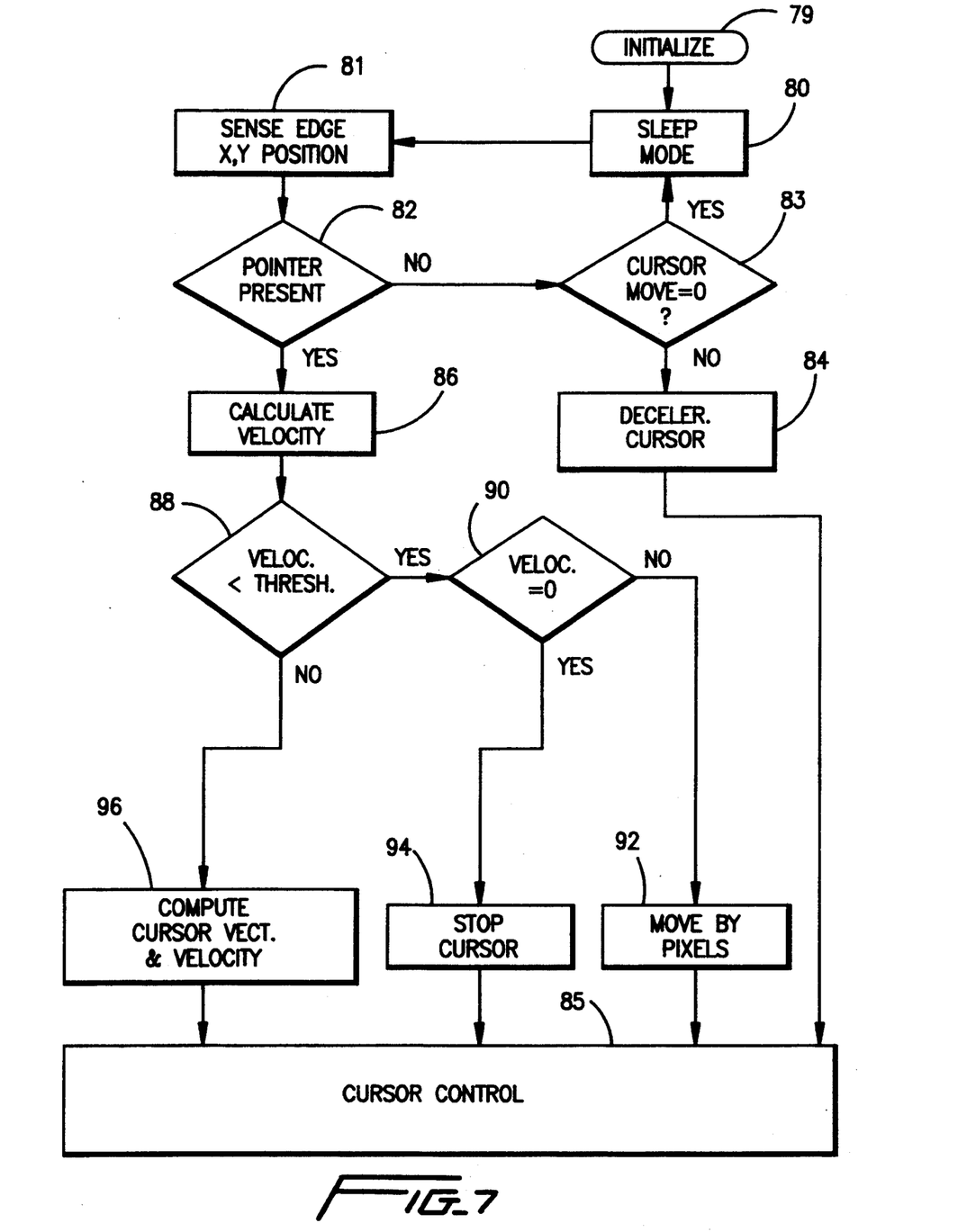
FIG. 7 is a flow diagram illustrating the operation of the microcontroller of FIGS. 4 and 6.

The manner in which the single chip microcontroller operates to compute velocity may best be understood with reference to the flow diagram of FIG. 7. The microcontroller is initialized at 79 when power is applied to the unit, and the microcontroller then enters a sleep mode 80. Cyclically at 81, the unit checks the light detectors which scan the scanning area 16 to sense the edges of a pointer, and if a pointer is not present at 82, a determination is made at 83 as to whether or not the cursor was previously moving. If the cursor was previously moving, a deceleration control operation is generated at 84 and a command is sent to the cursor control at 85 to decelerate the cursor. If no previous cursor movement is sensed at 83, the sleep mode continues.

On the other hand, once a pointer is sensed in the scanning area 16, the leading and/or trailing edges of the pointer are sensed at 81 and generally, the movement of both edges is subsequently determined to calculate velocity and direction of movement, although this calculation can be made if only the leading edge or the trailing edge of the pointer is sensed. As the pointer moves, different individual detectors in the arrays 30 and 32 will become blocked by the opaque pointer, or different intensities indicative of distance will be sensed from the detectors 50, 52, 54 and 70.

At 81, the sensing area 16 is scanned separately in both the x and y directions by scanning either the multiplexers 71 and 73 in FIG. 6 or the multiplexer 71 in FIG. 4, and since the time between scans is a known time, velocity can be calculated at 86 by determining the distance that at least one edge of the pointer travelled in both the x and y directions during the elapsed time between successive scans in the x and y directions. Each direction is separately scanned to arrive at a velocity calculation for that direction. The calculated velocity for each direction is compared with a threshold velocity at 88, and if the calculated velocity for any direction is less than the threshold value, then it is determined at 90 if this velocity is greater than 0. If this velocity is greater than 0, a signal is provided at 92 to the cursor movement control 85 to move the cursor pixel by pixel in the relevant direction. On the other hand, if the velocity calculated is 0, a stop command is generated at 94 and sent to the cursor control 85 to stop cursor movement.

When the velocity at 88 is greater than the threshold value, then the vector movement and velocity of cursor movement is computed at 96 and provided to the cursor movement control 85.

Since movement of the pointer in both the x and y directions is sensed, the velocity vector controlling the cursor is a two dimensional vector, and the scaling coefficient between the pointer and the cursor velocity depends on the magnitude of the pointer velocity. If a pointer velocity has previously been sensed and then the pointer is completely removed from the scanning area 16, velocity control signals which decelerate the cursor in the same manner as would be achieved with a rotating track ball are provided. On the other hand, when the pointer stops all movement but is still present in the sensing area 16, all movement of the cursor is stopped in the same manner that a track ball would be stopped if held in place by a finger. The rate of slow down of the cursor without a pointer input, the maximum velocity threshold, and the scaling coefficient are all software controlled and could in fact be configured by the central processor unit 75 or alternatively by software contained in the microcontroller 69.

Since velocity rather than position sensing is accomplished by the track pad cursor positioning device 10, it is possible to employ a track pad 14 of very limited size, for multiple passes of a pointer across the sensing area 16 can be accomplished to move the cursor across the extent of a CRT screen. Since movement of the cursor in the previously determined vector continues when a finger or pointer is removed from the sensing area 16 to initiate a subsequent pass across the sensing area, no time is lost in moving the cursor by requiring multiple passes of the pointer to cause the cursor to traverse the CRT screen. Of course, the cursor can be stopped at any desired position by stopping all motion of the pointer or finger relative to the sensing area while maintaining the pointer or finger in the sensing area.

Figure 8:
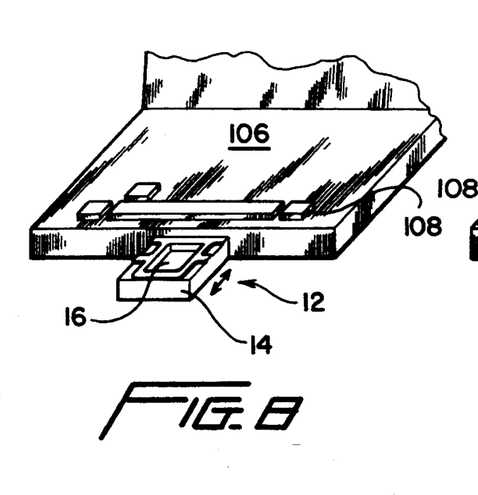
FIG. 8 is a perspective view showing the track pad cursor positioning device of the present invention mounted to slide under a computer keyboard.
Figure 9:
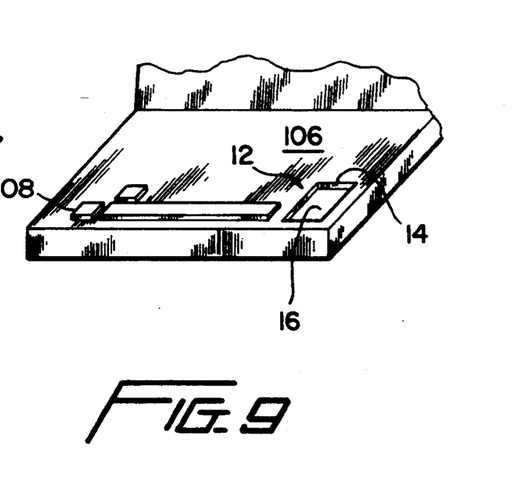
FIG. 9 is a perspective view of the track pad cursor positioning device of the present invention formed as an integral part of a computer keyboard.

With references to FIGS. 8 and 9, it will be appreciated that the small size of the sensing area 16 permits the use of a track pad 14 of limited size that may be easily incorporated in the structure of a personal computer 106. In FIG. 8, the track pad is in the form of a pull out drawer which may slide beneath the keyboard 108 of a personal computer. In FIG. 9, the track pad 14 is formed as an integral portion of the keyboard 108 adjacent to the computer operating keys.

Figure 10:
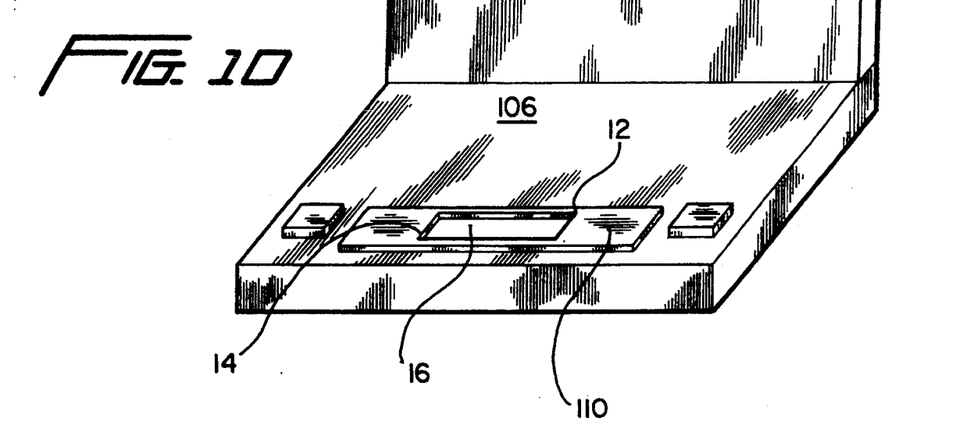
FIG. 10 is a perspective view of the track pad cursor positioning device of the present invention formed as an integral part of a computer keyboard space bar.
Figure 11:
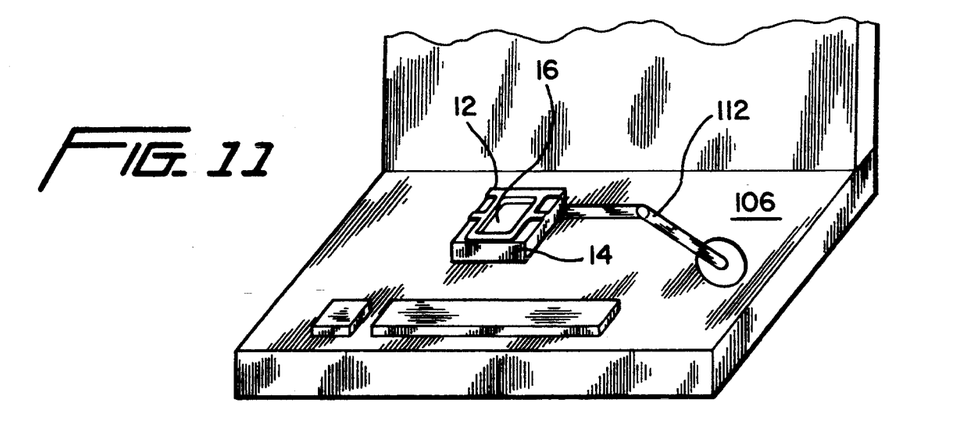
FIG. 11 is a perspective view of the track pad cursor positioning device of the present invention mounted by an extendable arm on a computer keyboard.

Since a pointer or finger used with the track pad cursor positioning device 10 does not need to physically contact or apply pressure to the sensing area 16, it is possible to mount the detection system 12 on a personal computer 106 in a manner which would not be possible if it was necessary to apply pressure to the sensing area. For example, as shown in FIG. 10, the detection system 12 may be incorporated in the space bar 110 for a personal computer 106, while in FIG. 11, the detection system is mounted on a pivotal retractable and extendable arm 112 connected to the face of the computer keyboard.

Industrial Applicability

The track pad cursor positioning device 10 converts the sensed velocity of a pointer on the pad to a cursor velocity which is a function of the sensed pointer velocity. Velocity sensing can be accomplished with no contact or only minimal contact with the track pad surface, and the function of a track ball can be easily simulated for both fine positioning and full screen coverage capability. By sensing either or both of the leading or trailing edges of a pointer, minute movements can be detected, and a velocity which is a vector of two dimensions can be achieved. The unit can be made to consume very little power and can be constructed in a small, thin package suitable for incorporation in laptop computers. This package is liquid impervious with no moving parts, and gravity or a surrounding environment is not required for operation of the device. Since the unit can be operated with either the finger or a pointer, handicapped people who use typing sticks attached to the body may use the device effectively. The track pad cursor positioning device 10 is immune to electrostatic and electromagnetic effects present in the surrounding environment, for the sensing area does not include a large area incorporating an electronic structure which is receptive to such effects. Thus the device is ideal for military use or use in noisy factory environments.

What is claimed is:

1. A method for controlling the movement of a cursor on a video screen using a pointer and a separate track pad having a sensing area which is smaller than the area of the video screen which includes the steps of:

transmitting two directional orthogonally oriented light curtains substantially parallel to and simultaneously across the entirety of said sensing area to create a sharply defined shadow of at least one edge of a pointer in two orthogonal directions x and y of pointer movement when said pointer is contacted by said light curtains, optically sensing only the velocities and direction of movement of said pointer in a first direction x and a second orthogonal direction y by detecting movement of the edges of said shadows when a pointer is moved in contact with said light curtains over the touch pad regardless of the actual position of the pointer within the sensing area of the touch pad;

generating a velocity control signal as a function of the velocity of movement of the pointer in each of the x and y directions; and using the velocity control signal to cause movement of the cursor on the video screen in the x and y directions at a velocity which is a function of the sensed velocities of the pointer.

2. The method according to claim 1 which includes forming said velocity control signal to be indicative of a vector in two dimensions formed from the velocities of said pointer in the x and y directions when the sensed velocity in the x and y directions exceeds a predetermined threshold velocity.

3. The method according to claim 2 which includes generating a first velocity control signal to control the movement and direction of movement of said cursor in a vector of the x and y directions at a speed which is a function of pointer velocity when the sensed velocity of the pointer in the x and y directions exceeds a predetermined threshold velocity and a second velocity control signal to cause only a more limited movement of said cursor in one or both of the x and y directions when the sensed velocity of the pointer in such direction is less than said predetermined threshold velocity.

4. The method of claim 3 which includes terminating the generation of said velocity control signals to terminate movement of said cursor after initially sensing the velocity of movement of said pointer when sensed movement of said pointer terminates and the presence of the pointer continues to be sensed.

5. The method of claim 4 which includes generating a velocity control signal to progressively decelerate the movement of said cursor after initially sensing the velocity of movement of said pointer and then the presence of said pointer ceases to be sensed.

6. A method for controlling the movement of a cursor on a video screen divided into pixels using a track pad having a sensing area which is smaller than the area of the video screen which includes the steps of:
 transmitting two directional orthogonally oriented light curtains substantially parallel to and simultaneously across the entirety of said sensing area to create a sharply defined shadow of at least one edge of a pointer in two orthogonal directions x and y of pointer movement when said pointer is contacted by said light curtains,
 optically sensing the velocities of movement of the pointer in the x and y directions over the track pad regardless of the actual position of the pointer on the track pad;
 comparing each of said sensed velocities to a predetermined threshold velocity and
 generating a velocity control signal and causing the velocity control signal to move the cursor in a two dimensional vector but only one pixel at a time in an x or y direction when the velocity of movement of the pointer in that direction is greater than zero but less than said threshold velocity and causing the control signal to move the cursor in a two dimensional vector at a velocity dependent upon the actual pointer velocity when the sensed velocity of movement of the pointer in the x and y directions is greater than said threshold velocity.

7. A method for controlling the movement of a cursor on a video screen which includes the steps of:
 optically sensing the presence and velocities of movement of a pointer in a first direction x and a second orthogonal direction y over a touch pad regardless of the actual position of the pointer on the touch pad;
 generating a velocity control signal as a function of the velocity of movement of the pointer in each of the x and y directions;
 using the velocity control signal to cause movement of the cursor in the x and y directions at a velocity which is a function of the sensed velocities of the pointer; and causing the velocity control signal to continue but progressively decelerate the movement of said cursor after the velocity of movement of said pointer has been sensed for a period of time and after the presence of said pointer is no longer sensed, whereby the pointer movement provides control analogous to a trackball input.

8. The method of claim 7 which includes terminating the generation of said velocity control signal to terminate movement of said cursor after initially sensing the velocity of movement of said pointer when sensed movement of said pointer terminates and the presence of the pointer continues to be sensed.

9. A track pad cursor positioning device for controlling the position of a cursor on a video screen by providing a cursor control signal for controlling the speed and direction of movement of a cursor to a cursor control means comprising:
 a track pad having a track surface, x sensing means mounted on said track pad for sensing the presence and velocity of movement of a pointer in an x direction above said track surface, y sensing means for sensing the presence and velocity of movement of said pointer in a y direction orthogonal to said x direction above said track surface; said x and y sensing means including a plurality of optical sensors; and
 means for generating a cursor control signal as a function of said sensed velocities in said x and y directions connected to said x and y sensing means, said means for generating a cursor control signal operating once a cursor control signal has been generated and cursor movement initiated to generate a cursor control signal which will progressively decelerate the movement of the cursor for a period of time after said x and y sensing means no longer sense the presence of said pointer, whereby the pointer movement provides control analogous to a trackball input.

10. The track pad cursor positioning device of claim 9 wherein said means for generating a cursor control signal operates to provide no cursor control signal upon the failure of said x and y sensing means to sense movement of said pointer while sensing the presence of said pointer.

11. The track pad cursor positioning device of claim 9 wherein said means for generating a cursor control signal operates to compare the sensed velocities of said pointer to a predetermined threshold value and to generate a cursor control signal to move said cursor for only a limited distance when said sensed velocities are less than said predetermined threshold value.

12. The track pad cursor positioning device of claim 9 wherein said x and y sensing means operate to sense the velocity of said pointer without requiring contact between said pointer and said tracking surface.

13. A track pad cursor positioning device for controlling the movement of a cursor on a video screen with a pointer by providing a cursor control signal for controlling the speed and direction of movement of the cursor to a cursor control means comprising:
 a track pad having a track surface which is smaller in area than the area of said video screen;
 first light transmitting means mounted on said track pad and operative to transmit a first collimated directional curtain of light simultaneously extending across the entirety of said track surface in a direction x;
 second light transmitting means mounted on said track pad and operative to transmit a second collimated directional curtain of light simultaneously extending across the entirety of said track surface in a direction y orthogonal to the direction x;
 said first and second light transmitting means operating to form first and second light curtains which create a sharply defined shadow at at least one edge of a pointer in two orthogonal directions of pointer movement when said light curtains are contacted by said pointer;

first and second light receiving means mounted on said track pad in opposed, spaced relationship to said first and second light transmitting means respectively and operative to sense the presence and movement of said pointer by sensing the sharply defined edges of said shadows and to provide output signals indicative of the sharply defined edges of the shadows from said pointer; and means for generating a cursor control signal connected to receive the output signals from said first and second light receiving means to obtain therefrom the velocity and movement of said pointer in the x and y directions, said means for generating a cursor control signal operating in response to said output signals from said first and second light receiving means to generate a cursor control signal operative to move said cursor in a vector of two dimensions which is a function of the movement of said pointer in the x and y directions at a speed which is a function of the velocity of movement of said pointer in the x and y directions.

14. The track pad cursor positioning device of claim 13 wherein said first and second light transmitting means each include at least one light source and a two dimensional parabolic mirror having a focal point, said light source being positioned at the focal point of said parabolic mirror.

15. The track pad cursor positioning device of claim 13 wherein said first and second light transmitting means each include at least one light source and light diffuser means to transmit at least as one component a collimated curtain of light from said light source.

16. The track pad cursor positioning device of claim 13 wherein said first and second light receiving means each include an array of closely packed individual light detectors spaced no more than 0.05 inches apart, and means to limit the field of view of each light detector which operates to cause the light detector to ignore non-directional components of light in the event that such non-directional components are present in the light transmitted by said first and second light transmitting means.

17. The track pad cursor positioning device of claim 13 wherein said first and second light receiving means each include an array of closely packed individual light detector means, each of which provides a detector output signal which is a function of the amount of light received thereby, said means for generating a cursor control signal including scanning means to scan the individual light detector means at a known repetitive scan rate to receive said detector output signal.

18. The track pad cursor positioning device of claim 17 wherein said scanning means separately scans the light detector means of said first and second light receiving means.

19. The track pad cursor positioning device of claim 17 wherein said means for generating a cursor control signal operates to generate a cursor control signal to progressively decelerate the movement of the cursor after the presence and movement of the pointer has been sensed by the first or second light receiving means and then the presence of the pointer is no longer sensed during cursor movement.

20. The track pad cursor positioning device of claim 18 wherein said means for generating a cursor control signal operates to compare the sensed velocities of said pointer to a predetermined threshold value and to generate a cursor control signal to move said cursor for only a limited distance when said sensed velocities are said predetermined threshold value.

21. The track pad cursor positioning device of claim 18 wherein said video screen is divided into pixels, and wherein said means for generating a cursor control signal provides a first velocity signal indicative of the velocity of movement of said pointer in the x direction from the detector output signals obtained from the scanning by said scanning means of said first light receiving means and a second velocity signal indicative of the velocity of movement of said pointer in the y direction from the detector output signals obtained from scanning by said scanning means of said second light receiving means, said means for generating a cursor control signal operating to compare each of said first and second velocity signals with a predetermined threshold velocity signal and to provide a cursor control signal operative to move the cursor pixel by pixel in the x direction of a two dimensional vector when the first velocity signal is greater than zero but less than the predetermined threshold velocity signal and a cursor control signal operative to move the cursor pixel by pixel in the y direction of a two dimensional vector when the second velocity signal is greater than zero but less than the predetermined velocity signal.

22. A track pad cursor positioning device for controlling the position of a cursor on a video screen for a computer having a keyboard by providing a cursor control signal for controlling the speed and direction of movement of the cursor to a cursor control means on the computer in response to the velocity and direction of movement of a pointer comprising:

a track pad having a track surface which is smaller in area than the area of said video screen, said track pad being directly mounted upon said computer keyboard;

sensing means mounted on said track pad to sense the presence and movement of said pointer relative to said track surface in two orthogonal directions x and y by sensing black body radiation emitted by said pointer, and to provide output signals indicative of the location of said pointer relative to said sensing means; and means for generating a cursor control signal connected to receive the output signals from said sensing means and operative to sense the velocity and movement of said pointer in the x and y directions, said means for generating a cursor control signal operating in response to said output signals to generate a cursor control signal operative to move said cursor in a vector of two dimensions which is a function of the movement of said pointer in the x and y directions, and at a speed which is a function of the velocity of movement of said pointer in the x and y directions, and causing the cursor control signal to continue but progressively decelerate the movement of said cursor after the velocity of movement of said pointer has been sensed for a period of time and after the presence of said pointer is no longer sensed, whereby the pointer movement provides control analogous to a trackball input.

23. The track pad cursor positioning device of claim 22 which includes mounting means on said computer keyboard to mount said track pad for sliding movement relative to said keyboard.

24. The track pad cursor positioning device of claim 22 wherein said computer keyboard includes a space bar, said track pad being formed on said space bar.

25. The track pad cursor positioning device of claim 22 which includes an extendable mounting arm having a first end connected to said track pad and a second end connected to said computer keyboard.

* * * * *